US 6,661,888 B2

United States Patent
Bell et al.

(10) Patent No.: US 6,661,888 B2
(45) Date of Patent: Dec. 9, 2003

(54) METHOD FOR MOVING TELECOMMUNICATIONS CUSTOMERS ONTO A NETWORK

(75) Inventors: Tim Bell, New York, NY (US); John Carr, Flourtown, PA (US); John Crowley, Westport, CT (US); Michael Hou, Matawan, NJ (US); Vern Kennedy, New York, NY (US); Akiko Matsuo, Edison, NJ (US); Paul Pennisi, Hoboken, NJ (US); Eric Roden, Mahopac, NY (US)

(73) Assignee: Open Support Systems, LLC, Westport, CT (US)

( * ) Notice: Subject to any disclaimer, the term of this patent is extended or adjusted under 35 U.S.C. 154(b) by 490 days.

(21) Appl. No.: 09/791,360

(22) Filed: Feb. 23, 2001

(65) Prior Publication Data

US 2002/0159580 A1 Oct. 31, 2002

(51) Int. Cl.[7] ............................................. H04M 7/00
(52) U.S. Cl. ........................... 379/221.13; 379/219
(58) Field of Search ............... 379/221.13, 221.01, 379/221.03, 219, 220.01, 279, 242, 114.27, 27.01, 221.06

(56) References Cited

U.S. PATENT DOCUMENTS

| | | | | | |
|---|---|---|---|---|---|
| 5,867,570 | A | * | 2/1999 | Bargout et al. | 379/221.13 |
| 6,160,880 | A | * | 12/2000 | Allen | 379/221.13 |
| 6,415,028 | B1 | * | 7/2002 | Bauer et al. | 379/221.13 |
| 6,526,137 | B1 | * | 2/2003 | Copley | 379/221.03 |

* cited by examiner

*Primary Examiner*—Benny Tieu
(74) *Attorney, Agent, or Firm*—Mayer, Brown, Rowe & Maw LLP

(57) ABSTRACT

Disclosed herein is a method for moving a plurality of telecommunications customers from an ILEC to a CLEC, the CLEC having a plurality of telecommunication lines, the method comprising: screening the customers; performing loop tests on the telecommunications lines; assigning physical and logical network inventory; provisioning one or more features for the customer; pre-wiring the telecommunications lines to a switch at a central office; generating a UNE-L order to the ILEC; receiving confirmation of an LNP request by the ILEC; activating the telecommunication lines; and generating an activate order to a NPAC.

22 Claims, 2 Drawing Sheets

METHOD FOR MOVING TELECOMMUNICATIONS CUSTOMERS ONTO A NETWORK

BACKGROUND OF THE INVENTION

1. Field of the Invention

The present invention relates to a method for moving telecommunications customers onto a network. Particularly, the present invention is directed to a fully automated method for moving telecommunications customers from one network to a different network.

Acronyms

The following acronyms, which are well understood in the art, have the meaning set forth below:

| | |
|---|---|
| CLEC | Competitive Local Exchange Carrier |
| CNAM | Calling Name And Management |
| CSR | Customer Service Record |
| ILEC | Incumbent Local Exchange Carrier |
| LIDB | Line Information Database |
| LNP | Local Number Portability |
| NPAC | Number Portability Administration Center |
| POTS | Plain Old Telephone Service |
| TSR | Total Service Resale |
| UNE-L | Unbundled Network Element-Loop |
| UNE-P | Unbundled Network Element-Platform |

2. Description of Related Art

The present invention is directed to a high volume, high efficiency method for moving telecommunications customers from an ILEC to a CLEC. The processes known in the art for moving customers from an ILEC to a CLEC have several disadvantages. The disadvantages of the prior processes are substantial in that they directly affect the quality and availability of customer telephony service. The prior processes are inherently inefficient, causing long delays in cut over processes and high error rates.

In the current telecommunications environment, companies compete for customers to be served through their telecommunications lines. FIG. 3 depicts a typical telecommunications network. Typically, service to a customer's premises 3 (such as a home or office or other premises capable of receiving telecommunications service) is carried via a telecommunications line 4 owned by an ILEC. At some point along the telecommunications line 4 there is a demarcation point 2. One or more telecommunications lines connect to a switch at a central office 1 from the demarcation point 2. In general, every telecommunications customer is allocated to a particular central office based on the digits of the customer's phone number.

A CLEC that wishes to serve a customer will usually lease the portion of the telecommunications line 4 from the ILEC in order to bring service to the customer's premises 3. The lease request is referred to as a UNE-L order. Both the ILEC and the CLEC may own telecommunications lines 5 and 6, respectively, from the switch 1 to the demarcation point 2. To transfer service to the CLEC, the ILEC will need to stop service on the ILEC's line 5 and switch 1 and activate service on the CLEC's line 6 and switch 7. This process comprises several steps to ensure that services are transferred correctly.

According to prior methods, for a CLEC to put a customer on their own switching facilities, the CLEC must obtain the ILEC CSR, order a local loop from the ILEC, assign logical and physical network inventory, perform feature provisioning (that is, provision the customer line features on the switch or network database), notify the NPAC for LNP, update E911 databases, and update the LIDB, with each of these steps performed manually. This results in an arduous, error-prone process. Those CLECs must employ many order entry clerks to first request an ILEC CSR for each customer order and interpret the data returned from the ILEC. The order entry clerk must then reenter the customer information into its own systems in order for the CLEC to generate its own bill. The information from the ILEC CSR is also needed in order to determine what features are to be provisioned onto the CLEC's own switch.

In addition, according to the prior method CLECs then must send each individual customer order from their order entry clerks to their network personnel to individually and manually provision features onto the CLEC's switch. The CLECs must then have their network personnel return the order back to their order entry clerks, including the office equipment port and cable pair assignments. This information is needed in order for the CLEC to properly generate unbundled network element loop (UNE-L) orders to the ILEC. CLECs must then manually issue on a per customer basis UNE-L orders, LNP confirmation and activation orders, E911 update orders and LIDB orders. It is an object of the present invention to provide embodiments that overcome these deficiencies by identifying a batch of customers for migration, automatically assigning the physical and logical network inventory, automatically provisioning one or more features for the customer, and batching all targeted UNE-L, LNP orders, E911 update orders and LIDB orders, all without having any order entry clerks individually type and coordinate every order.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

The invention relates to a high efficiency method for moving telecommunications customers from one network to another. The process for moving customers includes several steps. An error during any one of the steps will cause a failure of the customer to be moved. The present invention overcomes the disadvantages of the prior art by implementing a highly automated, high volume method that greatly reduces the number of errors.

The present invention also includes a high volume coordinated cut-over method that can be implemented by a computer system. In one embodiment, a computer system manages the process by implementing certain steps automatically upon receipt of a confirmation of successful implementation of a previous step. The computer system may include several computers at each of the locations where the steps are performed, connected over a network to a single server that contains a program for managing the process. The computers can communicate to the server computer when a step has been completed and subsequent steps may begin. Processes for communicating between computers over a network is well understood in the art, and will not be discussed in detail here. This computer-implemented method increases the number of customers that can be moved at once, while reducing chances for errors.

A feature of an embodiment of the present invention is a step for screening customers to be moved onto a network. Another feature of an embodiment of the present invention is the automated assignment of physical and logical network inventory. Another feature of an embodiment of the present invention is a step for provisioning a high volume of switch and/or network-database features and services at a central location. Another feature of an embodiment of the present invention is a step for generating a UNE-L order to an ILEC for a bundle of lines for favorably screened customers. Another feature of an embodiment of the present invention is a high volume wiring of telecommunication lines at a centralized local serving office. The advantages of these and other features of the embodiments of present invention is that quality and efficiency of the process is greatly improved while costs are reduced.

In brief, an embodiment of the invention includes a method for performing a cut over of a plurality of telecommunications customers from an ILEC to a CLEC, the CLEC having a plurality of telecommunication lines, the method comprising: screening the customers; performing loop tests on the telecommunications lines; assigning physical and logical network inventory; provisioning one or more features for the customer; pre-wiring the telecommunications lines to a switch at a central office; generating a UNE-L order to the ILEC; receiving confirmation of an LNP request by the ILEC; activating the telecommunication lines; and generating an activate order to a NPAC. In other embodiments, the invention further comprises performing a second metallic loop test to confirm success of the process. In other embodiments, the invention further comprises generating a line information database update. In other embodiments, the invention further comprises generating an E911 record update.

Other embodiments of the invention include a computer-implemented system for performing a cut over of a plurality of telecommunications customers from an ILEC to a CLEC, the CLEC having a plurality of telecommunication lines, said system comprising at least one computer readable medium having program instructions for performing the steps of: screening the customers; receiving confirmation and results of loop tests on the telecommunications lines; assigning physical and logical network inventory; generating an order to provision one or more features; generating a UNE-L order to the ILEC; receiving confirmation of an LNP request by the ILEC; receiving confirmation that the telecommunication lines have been activated at the CLEC; and generating an activate order to a NPAC.

It is to be understood that both the foregoing general description and the following detailed description are exemplary and are intended to provide further explanation of the invention claimed.

The accompanying drawing, which is incorporated in and constitutes part of this specification, is included to illustrate and provide a further understanding of the method and system of the invention. Together with the description, the drawing serves to explain the principles of the invention.

DETAILED DESCRIPTION OF THE PREFERRED EMBODIMENT

Reference will now be made in detail to the present preferred embodiments of the invention, an example of which is illustrated in the accompanying drawings. The method and corresponding steps of the invention will be described in conjunction with the detailed description of the system.

Figure 1:
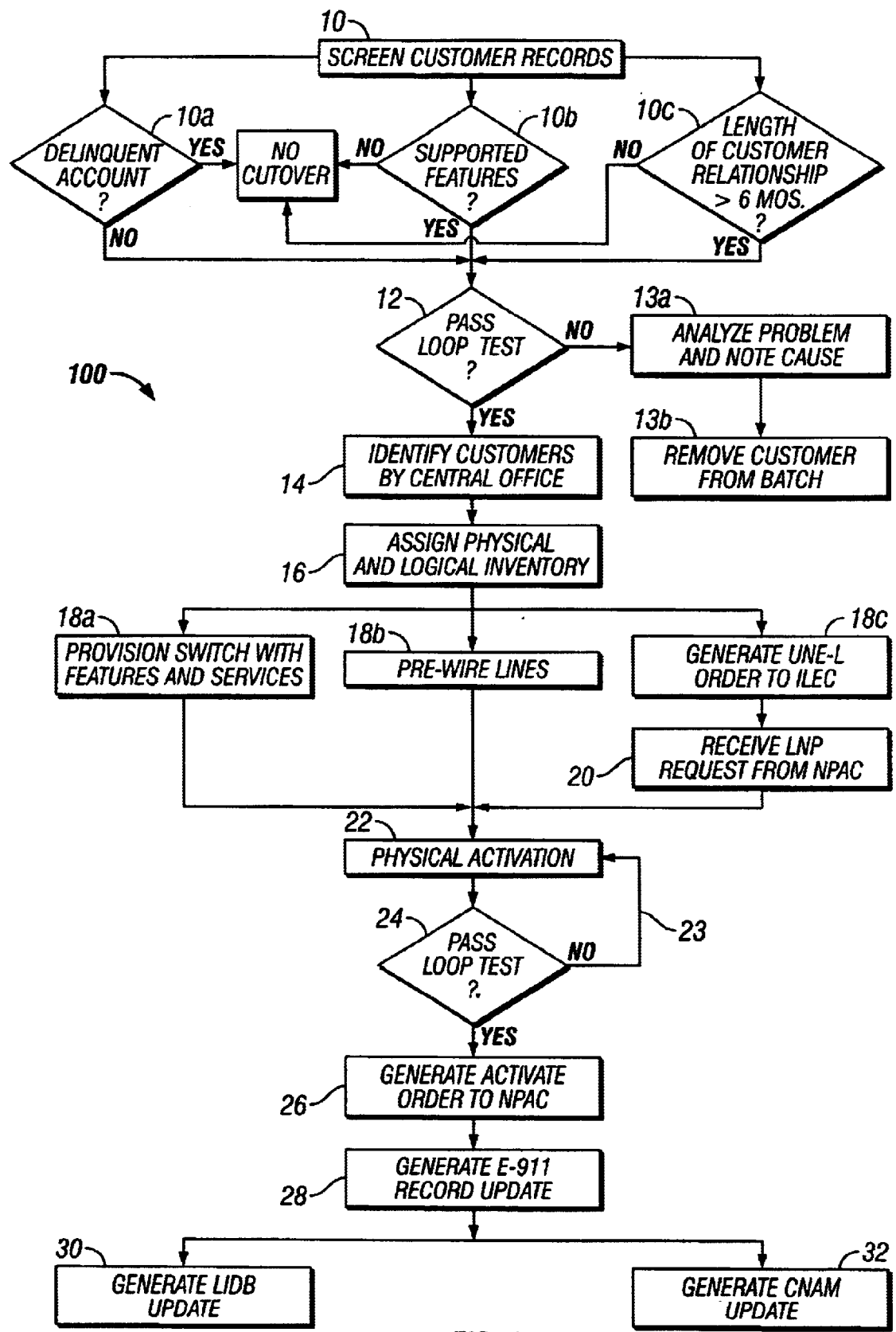
FIG. 1 is a schematic representation of an embodiment of the method according to the present invention.

For purpose of explanation and illustration, and not limitation, an exemplary embodiment of the system in accordance with the invention is shown in FIG. 1 and is designated generally by reference character 100.

The preferred embodiment of the present invention is a method for moving a high volume of customers on an ILEC's physical network (including, without limitation, on TSR or UNE-P) to UNE-L lines with a CLEC. In the preferred embodiment, the method is implemented through a computer system 150, an example of which is show in FIG. 2. According to the present embodiment, all of the activities are coordinated by a server 50. Preferably, the CLEC controls the server 50, although the server 50 could be controlled by any person or entity on behalf of the CLEC. The server 50 has a computer readable medium containing at least one computer program containing instructions for performing the cut over method. In the preferred embodiment, the coordinating server 50 is connected via network connections to the various parties involved in the process. Each of the various parties and their respective roles will be discussed in more detail in the description of the preferred methods that follow.

Figure 2:
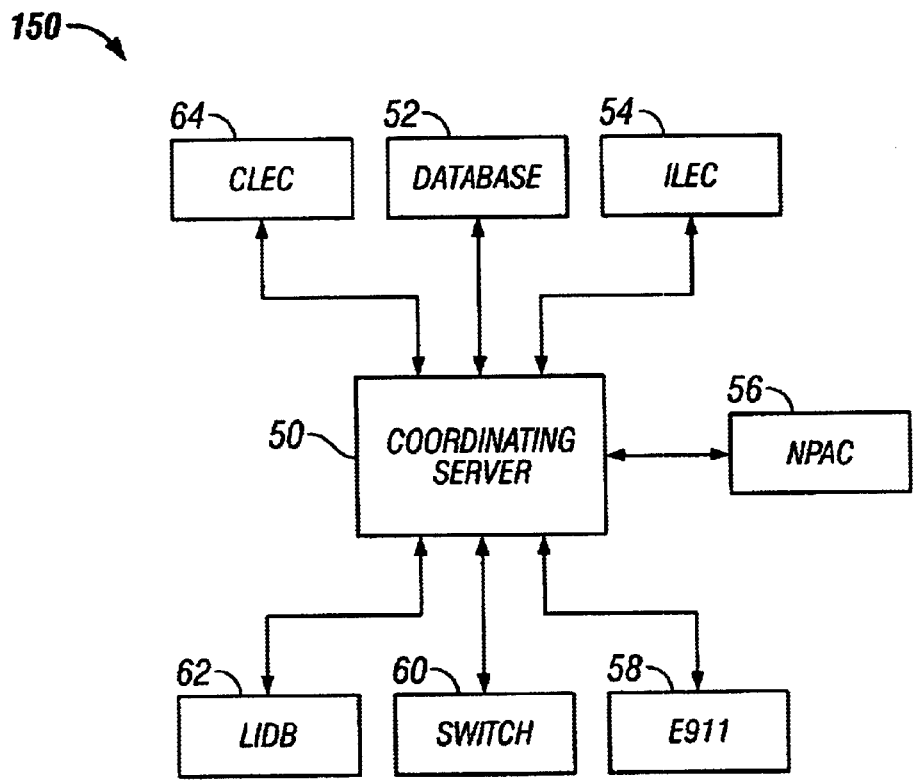
FIG. 2 is a schematic representation of an example of a computer system for implementing an embodiment of the present invention.
Figure 3:
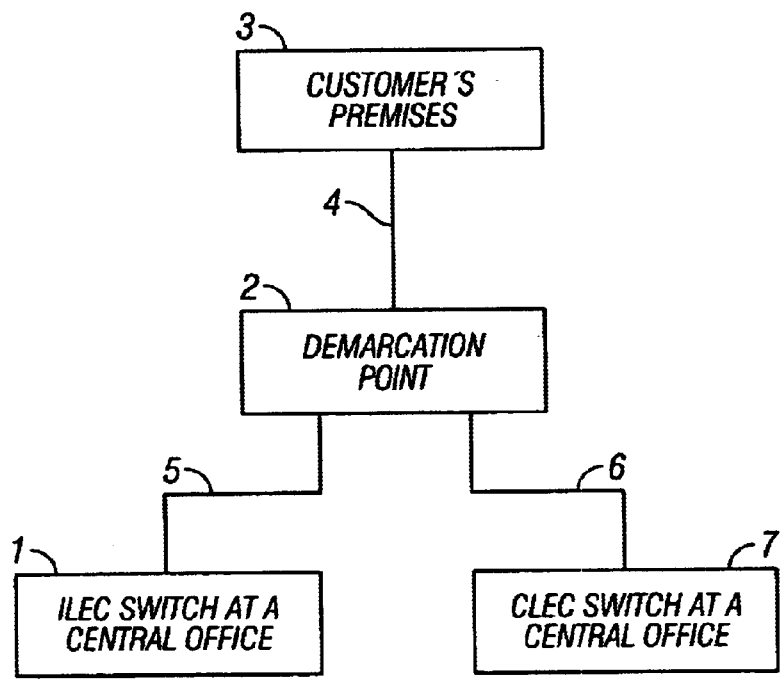
FIG. 3 is a schematic representation of a current telecommunications environment.

Referring to FIGS. 1 and 2, the embodiment 100 of the present invention comprises a first step for screening the customer records 10 of the customers to be cut over. The screening step 10 is preferably performed on a large scale to increase efficiency. Preferably, and most efficiently, the pool of eligible customers is selected from a single central office. Because customers are generally assigned to a central office by phone number, eligible customers can be sorted easily and efficiently by central office.

The screening step 10 can involve screening for any desirable customer characteristic that may be available, including without limitation, whether the customer has a history of late payment or non-payment with his present carrier 10a. Other screening criteria may include whether the customer has been with his current carrier for a predetermined length of time 10c. In some cases, it may be advisable not to move customers to a new telecommunications service provider if the customer has been with the current provider for less than a certain amount of time, such as, for example six months. Other screening criteria may include suspension status, or other criteria that may be desirable to the CLEC.

Another useful screening criteria is whether the customer has features or a class of service (such as for example, business or residential service, or flat rate or measured rate payment) with the current carrier that are unsupported by the new carrier 10b. For example, not all telecommunications carriers support caller id with name. Therefore, it would be advantageous to screen the customer's service record to determine whether the customer could lose features or service classes by switching carriers. In some cases, the new carrier may reject the customer for having an unsupported feature or service class, causing delays and inefficiencies in the process. Alternatively, a customer may be cut over to the network, but with a loss of features or services.

Once the screening step 10 is completed, a loop test is performed 12 on the customers' existing lines. The loop test may be a metallic loop test, but may also be other types of loop test currently performed or later developed. Where the screening step 10 is automated, such as via a computer system 150, an output is generated by the server 50 to request the ILEC to perform the loop tests 12. The ILEC will perform the loop test and transmit the results back to the CLEC via connection to the server 50. If the test results indicate that the line does not meet quality standards or is otherwise incompatible with the CLEC's network, the problem can be researched 13a and the customer can be removed from the batch to be cut over 13b. If the CLEC cuts over a customer from a failed line, the customer may find that he is without service on the CLEC's network. The value of the loop test is to eliminate the risk of attempting to cut over a customer whose line is "bad", thus causing the customer to lose service.

In the preferred embodiment, the results of the loop tests 12 are transmitted to the server 50. Once all customers having problem lines have been removed from the batch, the computer system 150 preferably sorts the customers by central office 14. The principal advantage of the present embodiment of the invention is that cut overs of multiple lines in large batches at a single central office is more efficient than cutting over individual lines at multiple central offices.

After the eligible customers are sorted following the loop test 12, physical and logical network inventory can be assigned 16. In this step 16, cable pairs are physically assigned to an available office equipment port, and the port is assigned to a customer to be cut over. In the preferred embodiment, the computer system 150 pools available cable pairs, ports and eligible customers and assigns them all to each other in a one-to-one arrangement. It should be understood, however, that the present invention is susceptible to alternative embodiments that do not require a one-to-one arrangement, such as, for example, the cutting over of non-POTS service. This process 16 occurs automatically, by central office, following successful loop tests 12.

Once network inventory has been assigned 16, the server 50 manages a number of steps that may or may not occur in parallel, depending upon the particular choice of implementation. In one step, the server 50 generates an order to begin provisioning one or more features 18a. The features being provisioned may be either switch-based features or network database features, and both are intended to be within the scope of the present invention. In this step 18a, the new port is assigned the class of service and features assigned to the applicable customer. In another step 18b, the server 50 generates an order that telecommunication lines should be pre-wired to the ILEC's network element. Because the customers being cut over are all located at a single central office, the pre-wiring of many lines can be done by a single technician at a single location. This feature of the present embodiment of the invention is far more efficient than the prior processes which required pre-wiring to occur at multiple locations by multiple technicians. At this time, the customer is physically wired to both the ILEC and the CLEC. Because all of the pre-wiring is set at a single central office, a large batch of customers are now in position to be quickly and easily cut over to the CLEC's network as soon as the actual physical activation is ordered. The third step that may be performed at this juncture is to generate a UNE-L order to the ILEC 18c. Preferably, this step is performed by the computer system automatically, followed by an automatic receipt and processing of its confirmation.

The ILEC will then issue a LNP request at any time following the UNE-L order 18c. The LNP request will notify the NPAC that the phone number previously on the ILEC's switch is now to be associated with the CLEC at the scheduled date of the cut over. Under current industry practice, the NPAC forwards the ILEC's request to the CLEC. The CLEC (through server 50 in the preferred embodiment) will electronically and automatically receive and process this request and send a confirmation back to the NPAC 20. The automation of this step 20 provides creates an advantage over prior manual processes. If the NPAC does not receive confirmation from the CLEC within 18 hours of the ILEC's order, the LNP request will be canceled. If this occurs, but the customer is cut over anyway, the customer will not be able to receive any calls on the CLEC's network. The automation of the confirmation step 20 prevents loss of service after the cut over.

At this time, the customers are all set to be cut over. Because the computer system has already sorted the customers by central office 14, the step for physically activating the lines (that is, the cut over) 22 can be performed efficiently for multiple lines at a single central office. At a pre-determined time, a technician physically disconnects the customer's service from the ILEC's network and connects it to the CLEC network, although the cut over can be performed through an electronic or automated means without departing from the spirit of the invention. In addition, because the cut over 22 can be performed so quickly and efficiently, and because the activate orders to the NPAC 26 can be generated automatically by the computer system, the customers' loss of telecommunication service will be greatly minimized. Preferably, the cut over 22 is performed at times of low call volume, and the customer will not even be aware that he has briefly been without service. Because errors are reduced and the wiring is performed efficiently, there is a greatly reduced chance that the process will fail. Accordingly, delays (and consequently loss of service for the customer) can be minimized.

Upon completion of the cut over 22, another loop test may be performed 24 to verify that the new lines are operational. In one embodiment, the server 50 will initiate this step 24 at a predetermined time to coincide with the completion of the cut-over. Alternatively, individuals at the central office may send an electronic message to the computer system indicating completion of the wiring 22. If the lines fail the test 23, the cut over 22 may be repeated. Alternatively, the ILEC may investigate the cause of the problem and re-wire the customers onto a different set of lines.

If the loop test is successful, an activate order is generated to the NPAC 26. This order tells the NPAC that calls to a customer's assigned telephone number should be routed through the CLEC's switch. Once activated, the customer will have complete telecommunications service from the CLEC.

In additional embodiments, the server 50 will automatically generate an E911 record update 28 so that the customer maintains emergency 911 service. In further embodiments, the computer system will automatically generate a LIDB update 30 so that the customer can, for example, receive collect calls, be identified in caller id features, or receive operator service calls. In further embodiments, the computer system will automatically generate a CNAM update 32. In the preferred embodiment, this step is performed at the same as the LIDB update 30.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method for performing a cut over of a plurality of telecommunications customers from an ILEC to a CLEC, the CLEC having a plurality of telecommunication lines, said method comprising:

performing loop tests on the telecommunications lines;

assigning physical and logical network inventory;

provisioning one or more features for the customer;

pre-wiring the telecommunications lines to a CLEC switch at a central office;

generating a UNE-L order to the ILEC;

receiving confirmation of an LNP request by the ILEC;

activating the telecommunication lines; and generating an activate order to a NPAC.

2. The method as recited in claim 1 further comprising screening the customers.

3. The method as recited in claim 1 further comprising performing a second loop test to confirm success of the method.

4. The method as recited in claim 1 further comprising generating a line information database update.

5. The method as recited in claim 1 further comprising generating a CNAM update.

6. The method as recited in claim 1 further comprising generating an E911 record update.

7. The method as recited in claim 2 wherein the step for screening the customers comprises checking the payment history of one or more of the customers.

8. The method as recited in claim 2 wherein the step for screening the customers comprises checking the length of the relationship between the ILEC and at least one of the customers.

9. The method as recited in claim 2 wherein the step for screening the customers comprises checking whether any of the customers has features not supported by the CLEC.

10. The method as recited in claim 2 wherein the step for screening the customers comprises checking whether any of the customers has a class of features not supported by the CLEC.

11. The method as recited in claim 2 wherein the step for screening the customers comprises checking whether any of the customers has had service suspended by the ILEC.

12. A computer-implemented system for moving a plurality of telecommunications customers from an ILEC to a CLEC, the CLEC having a plurality of telecommunication lines, said system comprising a computer readable medium having program instructions for performing the steps of:

receiving confirmation of loop tests on the telecommunications lines;

generating a UNE-L order to the ILEC;

assigning physical and logical network inventory;

provisioning one or more features for the customer;

generating an order to perform pre-wiring of the telecommunications to a CLEC switch at a central office;

receiving confirmation of an LNP request by the ILEC;

receiving confirmation that the telecommunication lines have been activated; and generating an activate order to a NPAC.

13. The method as recited in claim 12 further comprising screening the customer.

14. The method as recited in claim 12 further comprising performing a second loop test to confirm success of the method.

15. The method as recited in claim 12 further comprising generating a line information database update.

16. The method as recited in claim 12 further comprising generating a CNAM update.

17. The method as recited in claim 12 further comprising generating an E912 record update.

18. The method as recited in claim 13 wherein the step for screening the customers comprises checking the payment history of one or more of the customers.

19. The method as recited in claim 13 wherein the step for screening the customers comprises checking the length of the relationship between the ILEC and at least one of the customers.

20. The method as recited in claim 13 wherein the step for screening the customers comprises checking whether any of the customers has features not supported by the CLEC.

21. The method as recited in claim 13 wherein the step for screening the customers comprises checking whether any of the customers has a class of features not supported by the CLEC.

22. The method as recited in claim 13 wherein the step for screening the customers comprises checking whether any of the customers has had service suspended by the ILEC.

* * * * *

UNITED STATES PATENT AND TRADEMARK OFFICE
CERTIFICATE OF CORRECTION

PATENT NO. : 6,661,888 B2
DATED : December 9, 2003
INVENTOR(S) : Bell et al.

It is certified that error appears in the above-identified patent and that said Letters Patent is hereby corrected as shown below:

<u>Title page,</u>
Item [56], insert the following:
-- References Cited
U.S. PATENT DOCUMENTS,
5,881,131   3/1999   Farris et al. ......................... 379/27
6,122,362   9/2000   Wilson-Hooker et al. .............. 379/230

FOREIGN PATENT DOCUMENTS
WO   02/062079 A2   8/2002
EP   1 229 705 A2   8/2002

OTHER PUBLICATIONS
"Broadview Networks Opens Leading-Edge Network Operations Center in Philadelphia Area," December 12, 2000
"NHC and Harris Corporation Sign Interoperability Agreement For Complete DSL Provisioning Solution," February 15, 2001
"ControlPoint - MDF/IDF Line Management in an ILEC Central Office or Remote Environment," February 2000
"Minutes of the 6/12/2000 Working Group," New York State - Public Service Commission, July 5, 2000
"End User Migration Guidelines CLEC to CLEC Phase II," Local Migration Guidelines, New York State - Public Service Commission, June 12, 2002 --

Signed and Sealed this

Fourth Day of May, 2004

JON W. DUDAS
*Acting Director of the United States Patent and Trademark Office*